May 17, 1927.

R. P. JACKSON ET AL

MOLDED PLYWOOD

Filed Jan. 13, 1922

1,628,886

WITNESSES:

INVENTOR
Ray P. Jackson, George C. Kent &
Elbridge J. Casselman.
BY
ATTORNEY

Patented May 17, 1927.

1,628,886

UNITED STATES PATENT OFFICE.

RAY P. JACKSON, OF EDGEWOOD PARK, GEORGE C. KENT, OF TURTLE CREEK, AND ELBRIDGE J. CASSELMAN, OF PITTSBURGH, PENNSYLVANIA, ASSIGNORS TO WESTINGHOUSE ELECTRIC AND MANUFACTURING COMPANY, A CORPORATION OF PENNSYLVANIA.

MOLDED PLYWOOD.

Application filed January 13, 1922. Serial No. 528,964.

Our invention relates to composite material and more especially to composite plywood comprising thin layers of wood consolidated with a hardened binder to form an integral mass.

It is among the objects of this invention to provide a composite material which shall have great mechanical strength, be unaffected by moisture, heat and other atmospheric conditions and also by oil, weak acids and alkaline solutions.

Another object of this invention is to produce material of the above designated character by a process which is inexpensive and relatively simple, and which is adapted to quantity production.

Another object of this invention is to provide a material having such characteristics as will adapt it for use in many applications, such as where a non-metallic material having great mechanical strength is required or where such material should possess both great mechanical and great dielectric strength.

Wood veneer formed of layers of wood glued together by a binder, such as blood glue, casein or the like, has been well known. The strength of the material thus formed is generally less than that of the individual layers on account of the intermediate layers of relatively weak glue. In order to render the strength of the veneer material more uniform in all directions, it was customary to assemble the fibres of the various layers at angles to one another before gluing.

The composite plywood constituting the subject of this invention differs from the well known wood veneer in several respects. The binder does not only form the bond between the various layers but permeates the same. The material is molded under heat and pressure, producing a composite structure which is much stronger than the original material. Molding compresses the fibres of the layers making them denser and more resistant to strain.

The material generally comprises layers of wood veneer, such as poplar, cherry, oak, ash, hickory, or the like, varying in thickness from $\frac{1}{32}$ to $\frac{1}{16}$ of an inch. The veneer is properly seasoned by drying and curing and is then impregnated with a solution of a pure phenolic condensation product. We have found that a pure, fresh phenolic condensation product which has been kept out of contact with air, to avoid oxidation, gives the best results, and that articles formed therefrom are greatly superior to those employing the ordinary commercial grades of resinous binders. The oxygen absorbed from the air by such binders has a tendency to produce a very brittle and, consequently, defective material.

After impregnating the layers of veneer they are placed in suitable heated and evacuated drying chambers to drive off the solvent, if any, and the atmospheric moisture absorbed in the treating process. A plurality of layers of the material is then assembled, the grain of the various layers being at angles to each other and the assembly placed in a hydraulic press. Heat and pressure are applied to consolidate and compress the mass to form a hard, integral, composite structure.

We have found that, by employing relatively low temperatures, between 120° and 150° C., and relatively high pressures, ranging from 1,000 to 2,000 pounds per square inch, a material of superior physical characteristics is obtained. These temperature and pressure ranges are important in that a slight variation therefrom often causes a variation of one hundred per cent in the physical qualities of the material produced.

The phenolic condensation product becomes plastic when heat is first applied and the pressure forces it into the porous wood layers which are compressed to about one-half of their normal thickness, in which condition they become permanently set upon the hardening of the binder caused by the continued heating while maintaining pressure on the material. The resultant product is a hard, unitary structure of uniform thickness and density. The density of the structure is considerably greater than the density of the layers of wood used. The proportion of the binder or phenolic condensation product to the wood layers is usually approximately 10 per cent by weight of the finished product.

In the accompanying drawings constituting a part hereof, in which like reference characters designate like parts, Figure 1 is a top plan view of an article formed in accordance with this invention;

A plurality of layers 1 and 2, impregnated with a phenolic condensation product, are superposed to form a material of the desired thickness. The layers 1 are disposed with the fibres at right angles to those of the layers 2, as shown in Figs. 2 to 6. The assembled layers are then placed between a pair of heatable pressure platens of a hydraulic press. Heat and pressure are applied to compact and harden the material to form a unitary structure, which becomes insoluble, infusible and of great density and strength.

Figure 1:
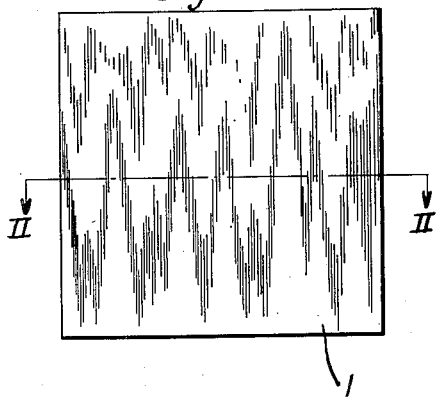
Figure 5:
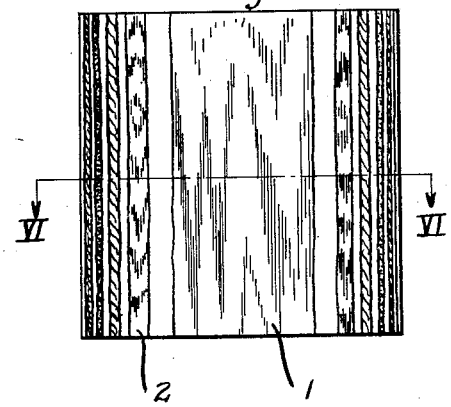
Fig. 5 is a top plan view of a similar article having its edges beveled.
Figure 2:
Fig. 2 is a cross-sectional view thereof taken along the line II—II of Fig. 1.
Figure 6:
Fig. 6 is a cross-sectional view thereof taken along the line VI—VI of Fig. 5.
Figure 3:
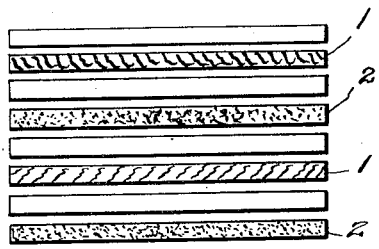
Fig. 3 is an exploded view of the structure shown in Fig. 2 before molding.

The surface of the material, after molding, has the appearance of the grain of the wood and the edges show alternate layers of light and dark shades, which can be advantageously shown by beveling the edges 3, as shown in Figs. 5 and 6, to produce decorative designs.

Figure 4:
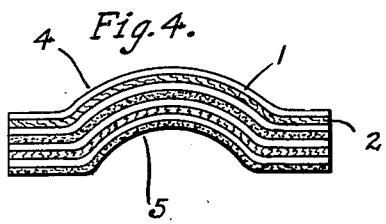
Fig. 4 is a cross-sectional view of an article having a curved contour.
Figure 7:
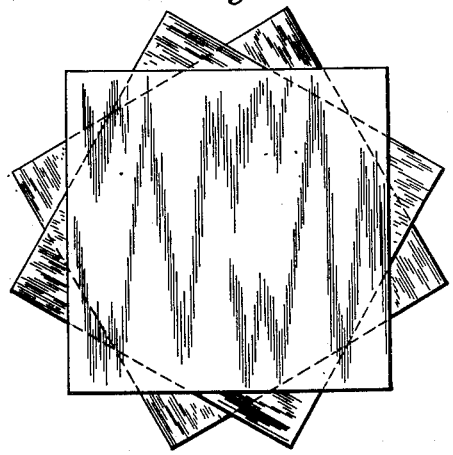
Fig. 7 is a top plan view of a plurality of layers of wood disposed with the fibres of the layers in angular relation to one another.

Variously shaped articles may be formed by providing suitably shaped molds having contours therein corresponding to the contours 4 and 5 of the article (Fig. 4). The layers of treated wood veneer may be disposed as indicated in Fig. 7, to produce a more homogeneous grain structure throughout the finished article. This is not essential, however, inasmuch as the material does not warp or otherwise lose its shape after it has been finally cured in the molding process.

We have found that articles formed in accordance with the above process have a transverse strength of approximately 40,000 pounds per square inch and a tensile strength of 32,000 pounds per square inch, whereas, an average of 25,000 and 18,000 pounds per square inch transverse and tensile strength, respectively, are obtained when oxidized phenolic condensation products or when excessively high steam or low molding pressures are employed.

It will be seen from the above description of our invention that articles formed in accordance therewith may be utilized for various mechanical and electrical applications, such as insulating material requiring great mechanical strength, and they may also be applied to machine elements, such as toothed gearing and surface friction disks or wheels.

Although we have described a specific embodiment of our invention, it will be obvious to those skilled in the art that various changes may be made in the details of our process without departing from the principles herein set forth. For instance, the molding temperatures may be lowered and the time for curing the material may be prolonged. The thickness of the layers of material used may be varied at will and the degree of impregnation thereof controlled to give desired results. These and other changes in detail of our invention may be made without departing from the spirit thereof.

We claim as our invention:

1. Composite material comprising a plurality of superposed layers of wood and fresh, unoxidized phenolic condensation product, said layers being compressed to form a dense, integral mass.

2. Composite material comprising a plurality of superposed layers of wood and fresh, unoxidized phenolic condensation product, the fibres of alternate layers being at angles to one another, said layers being compressed to form a dense, integral mass.

3. Composite material comprising a plurality of superposed layers of wood veneer and fresh, unoxidized phenolic condensation product, the grain of alternate layers being at right angles to one another, said layers being compressed to one-half their normal thickness.

4. A method of forming composite material which comprises impregnating layers of wood with a phenolic condensation product, superposing a plurality of said treated layers and applying heat and pressure ranging from 1,000 to 1,500 pounds per square inch thereto to form a unitary structure.

5. A method of forming composite material which comprises impregating layers of wood with a phenolic condensation product, superposing a plurality of said treated layers and simultaneously applying a temperature of 120° to 150° C. and pressure ranging from 1,000 to 1,500 pounds per square inch thereto to form a unitary structure.

6. A method of forming composite material which comprises impregating layers of wood with fresh, unoxidized phenolic condensation product, superposing a plurality of said treated layers and simultaneously applying a temperature of 120° to 150° C. and pressure ranging from 1,000 to 1,500 pounds per square inch thereto to form a unitary structure.

In testimony whereof, we have hereunto subscribed our names this 4th day of January 1922.

RAY P. JACKSON.
GEORGE C. KENT.
ELBRIDGE J. CASSELMAN.